UNITED STATES PATENT OFFICE.

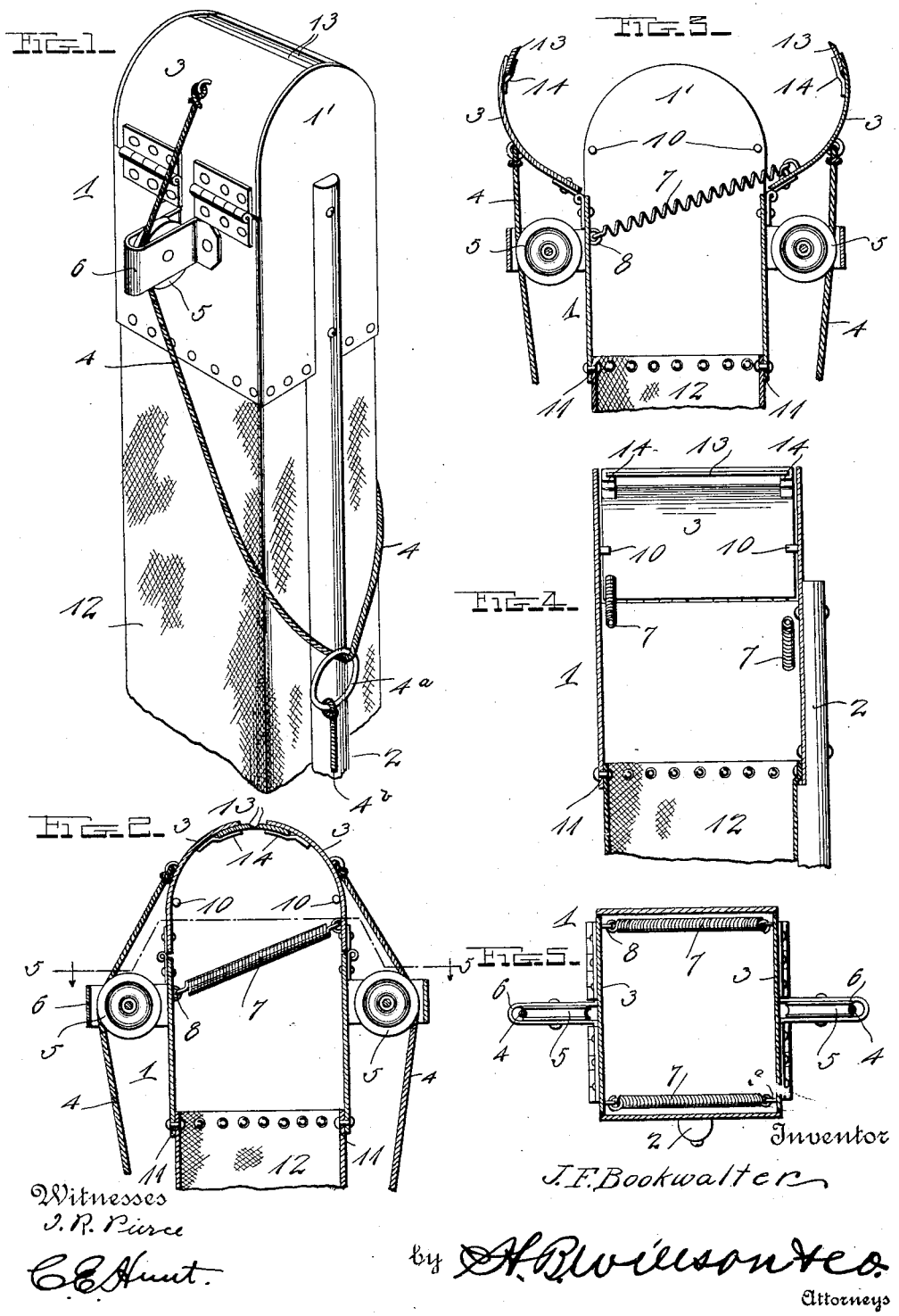

JOHN F. BOOKWALTER, OF PALESTINE, ILLINOIS.

FRUIT-PICKER.

1,039,640.  Specification of Letters Patent.  Patented Sept. 24, 1912.

Application filed April 4, 1912. Serial No. 688,475.

*To all whom it may concern:*

Be it known that I, JOHN F. BOOKWALTER, a citizen of the United States, residing at Palestine, in the county of Crawford and State of Illinois, have invented certain new and useful Improvements in Fruit-Pickers; and I do declare the following to be a full, clear, and exact description of the invention, such as will enable others skilled in the art to which it appertains to make and use the same.

This invention relates to fruit pickers, and it consists of certain novel features of construction, combination, and arrangement of parts as will be more fully described and particularly pointed out in the appended claim.

In the accompanying drawings; Figure 1 is a perspective view of my improved fruit picker; Fig. 2 is a vertical sectional view thereof with the jaws in closed position; Fig. 3 is a similar view with the jaws in open position; Fig. 4 is a vertical sectional view taken at right angles to Fig. 2; Fig. 5 is a horizontal section taken on the line 5—5 of Fig. 2.

My improved fruit picker comprises a head 1 which is preferably constructed of light sheet metal and is here shown as being of rectangular form. The head 1 is secured to the upper end of a supporting rod or pole 2 which may be of any suitable length. The end walls of the head 1 are extended upwardly as 1' and have their upper edges rounded or of semi-circular shape, said semi-circular projections of the ends forming closures for the ends of the picking jaws 3. The jaws 3 are hingedly connected at their lower edges to the upper edges of the side walls of the head 1 and swing outwardly when opened and when in closed position the upper edges of the jaws come together into close engagement for gripping and severing the stem of the fruit engaged by the jaws. The jaws 3 are opened by means of a cord 4 bent at about its center around the head and having each stretch led over a guide pulley 5 and connected with the outer side of one of the jaws as shown. With the lower looped center of the cord 4 is loosely engaged a ring 4ª to which is secured the upper end of an operating cord 4ᵇ which extends downwardly to within convenient reach of the operator. By using the ring 4ª a loose sliding connection is provided between the jaw opening cord and the operating cord thus causing the cords to pull evenly on the jaws, whereby the same will be opened together and to the same distance.

The pulleys 5 are revolubly mounted in loop shaped brackets 6 secured to the sides of the head 1 a short distance below the upper edges thereof. The looped outer portions of the brackets form guides which hold the cord 4 in engagement with the pulleys. In order to retract or draw the jaws together into engagement with the stem of the fruit, I provide coiled springs 7, one of which is arranged on the inner side of each end wall of the head 1 and has its lower end engaged with an eye 8 secured to the side wall of the head. When thus arranged the pressure of the springs will be exerted to retract or draw the jaws together after the same have been opened by the cord 4 in a manner described. In order to prevent the edges of the jaws from coming into forcible engagement when closed by the springs 7, I provide stops 10 which are here shown and are preferably in the form of short studs secured to the inner sides of the extended upper portions of the end walls 1' of the head as shown.

In the walls of the head 1 adjacent to the lower end thereof are formed apertures 11 by means of which the upper end of a fruit conducting tube or chute 12 is secured to the head, said tube being preferably formed of canvas or other suitable fabric and has its upper end riveted or sewed to the head through the apertures 11. The tube 12 may be of sufficient length to extend to the ground or said tube may correspond in length to the rod or pole 2 and may be tied or held in engagement with the pole to close the lower end of the tube.

For picking most varieties of fruits the engagement of the edges of the jaws with the stem of the fruit is sufficient to pick or sever the stem from the branch. It has been found, however, that in picking some fruits such as oranges and the like, the engagement of the edges of the jaws alone is not sufficient to sever the stems, and to overcome this difficulty I preferably provide cutting or severing blades 13 which are secured in any suitable manner to the edges of the jaws, said blades being here shown as having their ends engaged with retaining flanges 14 formed on the jaws adjacent to their ends as shown. When thus arranged the edges of the blades 13 will be brought into forcible engagement with the stems of the fruit when the jaws are closed by the springs 7, thus severing the fruit from the branches.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

Having thus described my invention, what I claim is;

The herein described fruit picker comprising a pole, a tubular head of rectangular cross section carried by the pole and having its end walls extended beyond its side walls, a tube depending from the lower end of said head, curved jaws hinged to the side walls and having blades at their free edges engaging each other when the jaws are closed, the jaws shaped to co-act at this time with the end walls of the head to practically close the latter, two contractile springs, each connected at one end to the inside of one jaw and at the other end to the inside of the opposite side wall of the head, the two springs standing adjacent and inside of the end walls of said head so as to leave the latter clear internally for the passage of fruit, guide pulleys pivotally supported on the outside of the side walls of the head, a ring, a cord connected to the outside of one jaw and passing through the ring to the other jaw, and an operating cord connected with said ring and leading down the pole.

In testimony whereof I have hereunto set my hand in presence of two subscribing witnesses.

JOHN F. BOOKWALTER.

Witnesses:
  S. L. SCOTT,
  MILLARD HAWKINS.

---

Copies of this patent may be obtained for five cents each, by addressing the "Commissioner of Patents, Washington, D. C."